Patented Sept. 7, 1954

2,688,636

UNITED STATES PATENT OFFICE 2,688,636

PREPARATION OF BENZALTHIOSEMICARBAZONES

Bruno Puetzer, Cincinnati, Ohio, assignor to Schenley Industries, Inc., New York, N. Y., a corporation of Delaware No Drawing. Application December 9, 1950, Serial No. 200,100

3 Claims. (Cl. 260—552)

This invention relates, generally to processes for manufacturing organic chemical compounds and, in a more particular sense, it is concerned with a process for the synthesis of thiosemicarbazones of aromatic aldehydes.

It is known that salts of hydrazine, such as the sulfate, are capable of metathetically reacting with a salt of thiocyanic acid to form the simple addition salt, hydrazinium thiocyanate ($H_2NNH_2$—$HSCN$), and that this substance is subject to intramolecular rearrangement in an aqueous medium to form thiosemicarbazide, according to the reaction represented as follows:

(a) $\quad H_2NNH_2 + HN:C:S \rightleftharpoons H_2NNH_2$—$HSC\equiv N$

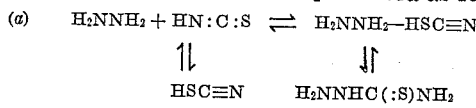

$HSC\equiv N \qquad H_2NNHC(:S)NH_2$

It will be noticed that this is a reaction that normally proceeds to an equilibrium merely, not to completion, and, further, that the reactant isothiocyanic acid is in equilibrium with the normal thiocyanic acid in the reaction medium, and the intramolecular rearrangement of the hydrazinium thiocyanate to the desired thiosemicarbazide also is a reaction that proceeds to an equilibrium state merely. It will be obvious that this method for synthesizing thiosemicarbazide, although it is probably the best method now known for producing this substance, has the disadvantage, characteristic of all equilibrant reactions, that it does not utilize the raw materials efficiently, because the reactions do not proceed to completion. This fact, and the high cost of the hydrazine starting material, contribute to the high cost of the reaction product, thiosemicarbazide. It also is known that thiosemicarbazide can be reacted with simple aliphatic ketones to yield thiosemicarbazones, according to a reaction that may be represented as follows:

(b)

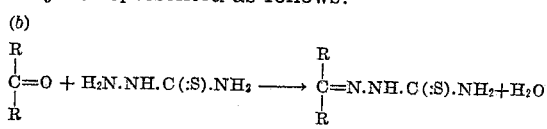

wherein R is a lower alkyl group.

Heretofore, aromatic thiosemicarbazones have been synthesized by direct reaction of the aromatic aldehydes with thiosemicarbazide, but this process has the disadvantage of requiring a very expensive raw material, thiosemicarbazide. It has also been proposed to synthesize aromatic, especially substituted aromatic, thiosemicarbazones by a stepwise reaction: a hydrazinium salt and a thiocyanate were reacted to produce an aqueous solution of hydrazinium thiocyanate which, after intramolecular rearrangement to thiosemicarbazide according to the equilibrant reaction of Equation a above and separation from by-products, was reacted with a simple low-molecular weight ketone, such as acetone. This reaction product, such as acetone thiosemicarbazone, was then isolated from by-products and reacted with an aromatic aldehyde to yield the desired final reaction product, according to reactions that may be represented as follows, using acetone as a typical lower aliphatic ketone and benzaldehyde as a typical aromatic aldehyde:

(c) 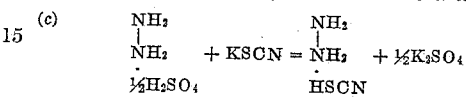

(d) 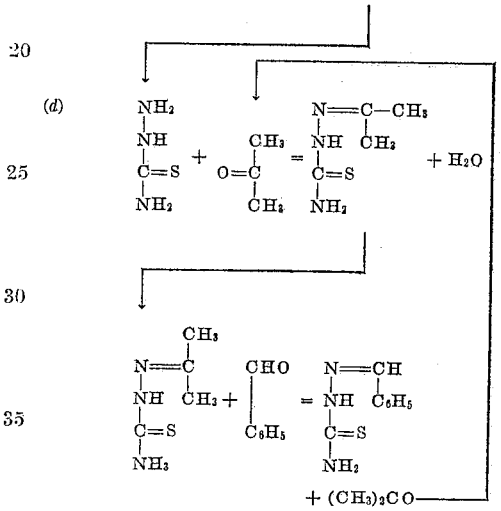

This process for manufacturing thiosemicarbazones of the aromatic series has the disadvantages of necessitating the synthesis and isolation of various intermediate products that materially increase the cost of operations without enhancing the value, yield or quality of the final product. However, to one skilled in the art, it would appear that attempted simplification of the above described process, by eliminating isolation or separation of intermediates, would be likely to lead to waste of expensive raw materials due to by-reactions, and otherwise would result in new, perhaps even more undesirable, operating difficulties than those inherent in the original process.

For instance, according to investigations reported in chemical literature, it would be expected that an attempt to combine the operations represented in Equations c and d above would not result in formation of the desired reaction products for the following reasons. The hydrazine, which is a very expensive reagent and therefore to be conserved if operating economies are to be effected, in the aqueous reaction medium containing acetone, a hydrazinium salt, anionic thiocyanate and cationic hydrogen, could be involved in competing reactions which may be represented:

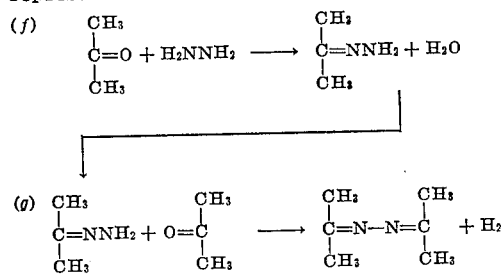

instead of the desired reactions represented by Equations c and d above.

The velocity of Reaction f is very high, even in the cold, and greatly exceeds the low velocity of intramolecular rearrangement of hydrazinium thiocyanate to thiosemicarbazide represented by Equation a, therefore it would be expected that attempted combination of Reactions c and d would result in waste of hydrazine through formation of the undesired acetone hydrazone product of Equation f, if not, indeed, the acetone ketazine product of Equation g.

Moreover, it would be expected that even if sufficient of the desired acetone thiosemicarbazone product of Equation d were produced under these conditions to permit the undertaking of the operations represented by Equation e without the isolation of intermediates, the acetone hydrazone product of Equation f, which has properties so closely related to the acetone thiosemicarbazone product that separation of the two compounds would present considerable difficulty, would interfere in this reaction by forming a difficultly-separable by-product, as follows:

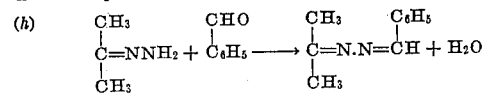

It follows, therefore, that, to one skilled in the chemical arts and versed in the field to which this invention relates, it would appear that the combination of two or more of the steps represented by Equations c, d and e above into a single operation would not be likely to result in anything more than merely a quantitatively token synthesis of the desired final product of Equation e, and certainly it would not be predicted that such a combination would be a highly efficient route for the synthesis of these materials.

One of the objects of this invention is to provide a process for the synthesis of thiosemicarbazones of the aromatic series, having the advantages over the above-described process that it is a direct and substantially a single-step operation, wholly eliminating certain of the costly process steps heretofore thought to be essential or at least unavoidable, and that, moreover, yields the desired products without necessity for the separation or isolation of intermediates.

The invention, also, has as an object the synthesis of these desired products by the utilization of raw materials that are substantially less costly and fewer in number, than the raw materials heretofore required for a like output of product, and which yields the products in a grade of purity that is at least comparable to that attained by the methods heretofore employed.

Other objects of the invention, and advantages that arise by utilizing the invention in the synthesis of aromatic thiosemicarbazones, will be obvious hereinafter as the detailed description of the invention proceeds.

It is now found, surprisingly and in contradiction to an informed prediction that reasonably might be based upon the condsiderations above set forth, that thiosemicarbazones of the aromatic series may be efficiently directly synthesized by interreaction of an aromatic aldehyde with hydrazine in the presence of anionic thiocyanate, whereby the desired products are obtained in high yield and in a high degree of purity.

The preferred embodiment of the invented process utilizes hydrazinium thiocyanate in aqueous solution, which may be produced by mixing hot solutions of a hydrazinium salt, such as the sulfate, and of a suitable water soluble thiocyanate, preferably an alkali metal thiocyanate such as potassium thiocyanate. In some instances, if the reaction by-product is a salt that is deposited from the mixed solutions, the supernatant liquor may be decanted or filtered off from the deposit, after cooling, to eliminate the residue by-product, but the invention is not limited to this preferred embodiment, of course, because the hydrazinium thiocyanate could be formed by interaction of other suitably reactive hydrazinium salts and thiocyanates, which would not produce insoluble by-products, or by-products that would tend to separate from the reaction mixture. It will be understood, however, that the by-product of the reaction for producing the hydrazinium thiocyanate need not be separated from the medium before reacting the hydrazinium thiocyanate with the aromatic aldehyde.

The reaction preferably is conducted in a liquid solvent medium which may be aqueous acetic acid containing, if desired, a lower aliphatic alcohol, such as ethanol. The process is carried out at a temperature within the range of room temperature upwards to about the boiling point of the reaction medium and, preferably at a temperature below but near the boiling point of water (ca. 100° C.). The optimum range is approximately 80° C. to about 100° C. This process is especially applicable to the synthesis of thiosemicarbazone of those aromatic aldehydes and especially benzaldehydes having functional groups as substituents of the aromatic nucleus, and among the functional groups that may thus appear as substituents are amino, amino protected by one or more N-acyl groups, nitro, alkyl, aralkyl, alkoxy, arylalkoxy, aryl, acyloxy, halo, sulfono, sulfonamido including N-acyl sulfonamido and the like.

To facilitate a better understanding of how the principles of this invention may be applied, the synthesis of representative types of aromatic thiosemicarbazones will now be described.

*Example I*

About 24.1 parts by weight (0.2 mole) of p-hydroxybenzaldehyde, 50 parts by weight of glacial acetic acid and 100 parts by weight of ethanol are charged into a suitable reaction vessel equipped for refluxing, and this mixture is stirred to assure homogeneity while it is heated at a temperature of about 80 to 85° C. A solution containing 36 parts by weight (0.4 mole) of hydrazinium thiocyanate in about 60 parts by weight of water is added to the reaction mixture and the temperature is maintained at about 80 to 85° C. for approximately 2¼ hours, the mixture being periodically agitated to assure homogeneity. The reaction mixture is then cooled to about 10° C. causing separating of the reaction product as a yellow crystalline mass which is removed by filtration, washed with about 50 parts by weight of methanol and dried at about 60° C. This product, p-hydroxybenzaldehyde thiosemicarbazone, has a melting point of about 228 to 233° C. and, upon recrystallization from ethanol, yielded an analytically pure substance:

Calc'd for $C_8H_9ON_3S$: N, 21.57; S, 16.4. Found: N, 21.05; S, 16.7.

The hydrazinium thiocyanate solution used in this process can be prepared by reacting about 48.5 parts by weight of potassium thiocyanate with approximately 42.5 parts by weight of dihydrazine sulfate, in 60 parts by weight of water. It is desirable to heat this mixture to a temperature of about 95° C. to facilitate complete solution of the reactants and formation of the hydrazinium thiocyanate. The mixture is thereafter cooled to about 10° C. and it may be then decanted from the separated potassium sulfate, or the separated by-product may be removed by filtration if desired.

*Example II*

About 32.6 parts by weight (0.2 mole) of p-acetylaminobenzaldehyde and approximately 95 parts by weight of acetic acid are heated in a suitable reaction vessel to a temperature of about 75° C. Then a solution of 36 parts by weight (0.4 mole) of hydrazinium thiocyanate in about 60 parts by weight of water is added. This hydrazinium thiocyanate solution may be prepared as described in Example I. The temperature of the reaction mixture is then raised to about 85° C. which causes slow thinning of the thick yellow slurry formed initially upon addition of the hydrazinium thiocyanate solution. The reaction mixture is maintained at this elevated temperature for about 1 hour, then the mixture is cooled to about 10° C. which causes separation of the reaction product, p-acetylaminobenzaldehyde thiosemicarbazone. The residue is washed with about 100 parts by weight of methanol, yielding about 38.5 parts by weight of light yellow product having a melting point, with decomposition, of about 234 to 236° C. Colorless crystals of this product may be obtained by recrystallization from aqueous ethanol.

Calc'd for $C_{10}H_{12}ON_4S$: N, 23.71; S, 13.57. Found: N, 23.00; S, 13.65.

*Example III*

A suitable reaction vessel is charged with approximately 32.6 parts by weight (0.2 mole) of p-acetylaminobenzaldehyde and about 157 parts by weight of acetic acid. The mixture is heated at about 100° C. and then approximately 80 parts by weight of aqueous hydrazinium thiocyanate solution is added. This solution may be prepared by mixing about 485 parts by weight (5 moles) of potassium thiocyanate with 425 parts by weight (2.5 moles) of dihydrazine sulfate (95%) in one liter of water, heating the mixture to about 95° C. then cooling it to about 10° C. and separating the precipitated potassium sulfate. The aldehyde hydrazinium thiocyanate mixture is heated at a temperature of about 90 to 100° C. for somewhat more than an hour, then it is cooled to about 10° C. causing separation of the reaction product, p-acetylaminobenzaldehyde thiosemicarbazone. The reaction product is separated by filtration, washed with water and dried in vacuo at about 60° C. Approximately 40.5 parts by weight of the product are obtained in this manner.

*Example IV*

Approximately 28.5 parts by weight of p-dimethylaminobenzaldehyde and about 157 parts by weight (0.2 mole) of acetic acid are charged into a suitable reaction vessel and heated to a temperature of about 100° C., then approximately 95 parts by weight of a hydrazinium thiocyanate solution, prepared as described in Example III and equivalent to about 0.36 mole of hydrazinium thiocyanate, is added. The mixture is heated at a temperature of about 90 to 100° C. for somewhat more than 1 hour, then it is cooled to room temperature, yielding a light red slurry which is filtered to recover the reaction product as a residue. This product, p-dimethylaminobenzaldehyde thiosemicarbazone, is washed with about 200 parts of methanol and 500 parts of water, yielding approximately 41.2 parts by weight of final product, having a melting point of about 211 to 214° C. and being almost completely pure as indicated by the following analysis:

Calc'd for $C_{10}H_{14}N_4S$: N, 25.20; S, 14.4. Found: N, 24.55; S, 14.9.

*Example V*

About 4.0 parts by weight (0.03 mole) of p-nitrobenzaldehyde and approximately 26.5 parts by weight of acetic acid are mixed in a suitable reaction vessel and heated at a temperature of approximately 100° C., then about 25 parts by weight of a hydrazinium thiocyanate solution, prepared as described in Example III and equivalent to about 0.075 mole of hydrazinium thiocyanate, is added to the mixture. The mixture, which is now a yellow slurry, is heated at about 100° C. for approximately 1 hour, then it is cooled to cause separation of the reaction product, which is removed by filtration and washed, first with methanol and then with water. Approximately 4.7 parts by weight of this yellow product, p-nitrobenzaldehyde thiosemicarbazone, is obtained in this manner. The product has a melting point, with decomposition, of about 247 to 249° C. and, after recrystallization from about 12 parts by weight of formamide, a purified material having a melting point of about 254 to 255° C., with decomposition is obtained.

Having thus described the subject matter of the present invention, what it is desired to secure by Letters Patent is:

1. Process for the production of aldehyde thiosemicarbazones which comprises heating at a temperature within the range of about 80° C. to about 100° C., a mixture of hydrazinium thiocyanate and a benzaldehyde in an aqueous acidic reaction medium, the hydrazinum thiocyanate initially being present in the reaction mixture in a molecular proportion exceeding that of the benzaldehyde, and recovering the thiosemicarbazone of the benzaldehyde from the reaction mixture.

2. Process for the production of aldehyde thiosemicarbazones which comprises heating at a temperature within the range of about 80° C. to about 100° C., a mixture of hydrazinium thiocyanate and a benzaldehyde in an aqueous solution of acetic acid, the hydrazinium thiocyanate initially being present in the reaction mixture in a molecular proportion exceeding that of the benzaldehyde, and recovering the thiosemicarbazone of the benzaldehyde from the reaction mixture.

3. Process for the production of aldehyde-thiosemicarbazones which comprises heating at about its boiling point, a mixture of an excess of hydrazinium thiocyanate with one molecular proportion of a benzaldehyde in an aqueous medium containing a water-miscible inert organic solvent.

References Cited in the file of this patent

UNITED STATES PATENTS

| Number | Name | Date |
|---|---|---|
| 2,450,406 | Bambas | Oct. 5, 1948 |
| 2,583,770 | Goth et al. | Jan. 29, 1952 |

OTHER REFERENCES

Young et al.: "J. Chem. Soc.," 1901, p. 57.

Chemical Abstracts, vol. 45 (1951), pp. 548–b.

Sah et al.: "Rec. Trav. Chim.," vol. 69, 1950, page 1547.

Evans et al.: "J. Chem. Soc." (London), 1943, page 571.

Puetzer et al.: "J. Am. Chem. Soc.," vol. 73, June 1951, p. 2958.